(12) United States Patent
He

(10) Patent No.: US 9,449,260 B2
(45) Date of Patent: Sep. 20, 2016

(54) CONSTRUCTING AND USING SUPPORT VECTOR MACHINES

(71) Applicant: BlackBerry Limited, Waterloo (CA)

(72) Inventor: Dake He, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 15 days.

(21) Appl. No.: 14/625,958

(22) Filed: Feb. 19, 2015

(65) Prior Publication Data

US 2016/0247045 A1 Aug. 25, 2016

(51) Int. Cl.
*G06K 9/00* (2006.01)
*G06K 9/62* (2006.01)
*G06N 99/00* (2010.01)
*G06K 9/66* (2006.01)

(52) U.S. Cl.
CPC ........... *G06K 9/6286* (2013.01); *G06K 9/6256* (2013.01); *G06K 9/66* (2013.01); *G06N 99/005* (2013.01)

(58) Field of Classification Search
CPC .... G06K 9/6286; G06K 9/6256; G06K 9/66; G06K 9/6217; G06K 9/6282; G06N 99/005; G06F 17/30256
USPC ....... 382/100, 155, 159, 162, 168, 173, 181, 382/224, 232, 254, 276, 309, 312, 325; 706/12, 20, 48, 45, 62, 13, 16, 21, 46, 706/47, 14, 15, 17, 25, 52, 55; 324/127, 324/129, 117 R, 527
See application file for complete search history.

(56) References Cited

U.S. PATENT DOCUMENTS

| | | | | |
|---|---|---|---|---|
| 7,817,833 B2* | 10/2010 | Ramsay | ................... | G06K 9/46 348/125 |
| 7,881,537 B2* | 2/2011 | Ma | ..................... | G06K 9/00348 382/103 |
| 7,899,253 B2* | 3/2011 | Porikli | ............... | G06K 9/00369 382/159 |
| 8,548,259 B2* | 10/2013 | Tuganbaev | .......... | G06K 9/6292 382/159 |
| 2001/0031076 A1* | 10/2001 | Campanini | ........... | G06F 19/345 382/128 |
| 2005/0196035 A1* | 9/2005 | Luo | .................... | G06K 9/00369 382/159 |
| 2008/0063264 A1* | 3/2008 | Porikli | ............... | G06K 9/00369 382/159 |

OTHER PUBLICATIONS

Support Vector Machine, (and Statistical Learning Theory), Tutorial, Jason Weston, NEC Labs America.
"Compact descriptors for video analysis (CDVA)," ISO/IEC/JTC1/SC29/WG11/N14509, Apr. 2014.
(Continued)

*Primary Examiner* — Sheela C Chawan
(74) *Attorney, Agent, or Firm* — Rowand LLP

(57) ABSTRACT

Methods and systems are described for building and using a support vector machine for classifying a new sample. Training samples of one class or another class are used to build the machine by mapping the angle space to a set of angle vectors and, for each angle vector, finding candidate hyperplanes that are orthogonal to a vector at the angle vector and radiating from an origin point to the hyperplane. An optimal pair of candidate hyperplanes at one of the angle vectors is selected on the basis of the distance between the pair and the number of samples between them. The selection may be based on hard margin or soft margin approaches. A matrix-based implementation is presented. New training samples may be added, removed, or reclassified without requiring recalculation of the entire support vector machine.

21 Claims, 5 Drawing Sheets

(56) References Cited

OTHER PUBLICATIONS

C. Cortes and V. Vapnik, "Support-vector networks," Machine Learning, vol. 20, pp. 273-297, 1995.
P. E. Hart, "How the Hough Transform was invented," IEEE Signal Processing Magazine, pp. 18-22, 2009.
S. Boyd and L. Vandenberghe, Convex optimization, Cambridge, UK: Cambridge University Press, 2009.
J. C. Platt, "Sequential minimal optimization: A fast algorithm for training support vector machines," in Advances in Kernel Methods—Support Vector Learning, The MIT Press, 1998, pp. 185-208.
D. Decoste and B. Scholkopf, "Training invariant support vector machines," Machine Learning, vol. 46, pp. 161-190, 2002.
E. Osuna, R. Freund and F. Girosi, "Improved training algorithm for support vector machines," in Proc. IEEE NNSP, 1997.
M. Ferris and T. Munson, "Interior point methods for massive support vector machines," SIAM Journal on Optimization, vol. 13, pp. 783-803, 2003.
S. Fine and K. Scheinberg, "Efficient SVM training using low-rank kernel representations," Journal of Machine Learning Research, vol. 2, pp. 243-264, 2001.
S. Shalev-Shwartz, Y. Singer and N. Srebro, "Pegasos: Primal Estimated sub-GrAdient SOlver for SVM," in Proc. ICML, 2007.
Z. A. Zhu, W. Chen, G. Wang, C. Zhu and Z. Chen, "P-packSVM: Parallel Primal grAdient desCent Kernel SVM," in Proc. ICDM, 2009.
EPO, Extended European Search Report relating to EP application No. 16155193.2 dated Jun. 21, 2016.
Roobaert D., "Directsvm: a fast and simple support vector machine perceptron", Neural Networks for Signal Processing X, 2000. Proceedings of The 2000 IEEE Signal Processing Society Workshop December 11-13, Piscataway, NJ, USA, IEEE, vol. 1, Dec. 11, 2000, pp. 356-365, KP010526381, DOI: 10.1109/NNSP.2000.889427, ISBN: 978-0-7803-6278-9, p. 359-p. 360.
Devis Tuia et al., "A Survey of Active Learning Algorithms for Supervised Remote Sensing Image Classification", IEEE Journal of Selected Topics in Signal Processing, IEEE, US, vol. 5, No. 3, 1 Jun. 2011, pp. 306-617, XP11478714, ISSN: 1932-4553, DOI: 10.1109/JSTSP.2011.2139193, Section I, Section IV.
Katagiri S. et al, "Incremental training of support vector machines using hyperspheres", Pattern Recognition Letters, Elsevier, Amsterdam, NL, vol. 27, No. 13, Oct. 1, 2006, pp. 1495-1507, XP027922635, ISSN: 0167-8655 [retrieved on Oct. 1, 2006, Section 3, Section 4.

\* cited by examiner

CONSTRUCTING AND USING SUPPORT VECTOR MACHINES

FIELD

The present application generally relates to classifiers and, in particular, to methods and devices that provide computationally-efficient support vector machine learning.

BACKGROUND

Support vector machines are used in binary classification of samples. A support vector machine is typically constructed using a set of training samples and quadratic programming techniques to solve the difficult computational problem of identifying a suitable classification hyperplane in the relevant data space. With multi-dimensional space, or a large number of samples, the building of a support vector machine using indirect quadratic programming is complex and difficult and often is unable to adapt to changes in the set of training samples.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
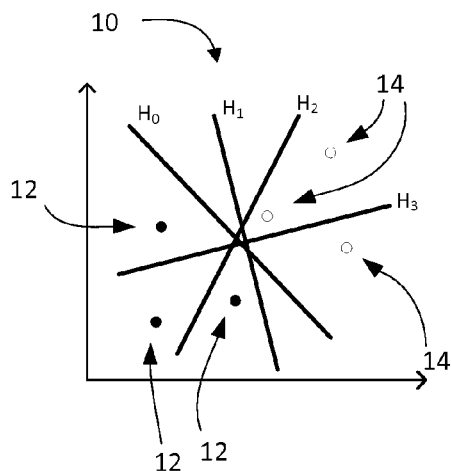
FIG. 1 shows an example 2-dimensional data space with training samples and hyperplanes.

In one aspect, the present application describes a method of building a support vector machine for classifying a new sample, the support vector machine being based upon a set of samples in an N-dimensional data space, the set of samples having a plurality of samples of one class and a plurality of samples of another class. The method includes mapping an angle space to a fixed set of angle vectors and, for each angle vector, finding, for each sample, a candidate hyperplane associated with that angle vector, wherein each candidate hyperplane is a radial distance from an origin point measured along a vector from the origin and normal to the candidate hyperplane, and wherein the vector points to the direction given by the angle vector in the data space. The method includes selecting a pair of the candidate hyperplanes as an optimal pair of hyperplanes on the basis of a distance between pairs of the candidate hyperplanes parallel to each other and the number of samples between the candidate hyperplanes; and determining a classification hyperplane as a hyperplane parallel to and between the optimal pair of hyperplanes. The classification hyperplane determines whether the new sample is in the one class or in the another class based on which side of the classification hyperplane the new sample is located.

In yet another aspect, the present application a support vector machine system for classifying a new sample, the support vector machine being based upon a set of samples in an N-dimensional data space, the set of samples having a plurality of samples of one class and a plurality of samples of another class. The system includes one or more processors; memory; and processor-executable instructions that, when executed by the one or more processors cause the one or more processors to carry out one or more of the described methods.

In another aspect, the method and system are for classifying a portion of an image or video. The portion of the image or video defines the new sample in the data space. The set of samples are classified image or video data.

In another aspect, the support vector machine is a classification device. In some embodiments the classification device is implemented on a computing device, mobile handheld device, a server, or the like.

In yet a further aspect, the present application describes non-transitory computer-readable media storing computer-executable program instructions which, when executed, configured a processor to perform the described methods.

Other aspects and features of the present application will be understood by those of ordinary skill in the art from a review of the following description of examples in conjunction with the accompanying figures.

In the present application, the term "and/or" is intended to cover all possible combination and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Support vector machines (SVMs) are supervised machine learning tools useful in classification and regression analysis. In their original forms, SVMs are designed for binary classification. If non-binary classification is required, a common approach is to decompose the problem into a series of binary classification problem. Given a set of training samples, which are either labelled positive "+" or negative "−" (or whatever other binary notation is desired for identifying one class versus another class), a SVM training algorithm intends to find a hyperplane that separates the two classes of training samples with the maximum margin. In one example, the maximum margin is found when the sum of the distance from the hyperplane to the nearest positive sample and the distance from the hyperplane to the nearest negative sample is maximized.

Reference is now made to FIG. 1, which shows a two-dimensional data space 10. It will appreciated that the data space may be of n-dimensions in other embodiments and that a hyperplane in an n-dimensional space is a plane of n-1 dimensions (e.g. in a three-dimensional space, the hyperplane is a two-dimensional plane). In the case of a two-dimensional data space, hyperplanes are one-dimensional lines in the data space.

The data space 10 has six example training samples 12, 14. The training samples include samples of one class, here termed "negative" samples 12, and samples of another class, here termed "positive" samples 14. Four candidate hyperplanes are shown, labelled $H_0$, $H_1$, $H_2$, $H_3$. It will be noted that $H_3$ does not separate the two classes; $H_1$ and $H_2$ do but with smaller margins than $H_0$; and $H_0$ separates the two classes with the maximum margin. Accordingly, a good SVM training process will output $H_0$ as the classification hyperplane, i.e. the hyperplane used to classify new samples as either positive or negative.

Formally, a SVM training algorithm learns the following function from the training samples, $$f(\vec{x}) = b + \langle \vec{w}, \vec{x} \rangle,$$

which in turn leads to the following classifier, $$\text{class}(\vec{x}) = \begin{cases} + & f(\vec{x}) \geq 0 \\ - & f(\vec{x}) < 0 \end{cases}.$$

In the above, $\vec{x}$ denotes the sample to be classified, $\vec{w}$ the normal vector that defines the desired hyperplane in a SVM, and b is a constant offset, which may be zero in some embodiments. $\langle \rangle$ denotes the inner product, i.e. the projection of $\vec{x}$ on to $\vec{w}$, which gives a point on $\vec{w}$ that is a distance from the origin. Let $\{(\vec{x}_i, y_i); 0 \leq i < n\}$ denote a set of n>1 training samples, where $y_i \in \{+1, -1\}$ denotes the label of $\vec{x}_i$. The function f is sometimes referred to as the decision function. In order to learn $f(\vec{x})$, typical SVM training algorithms formulate and try to solve the following quadratic programming (QP) problem.

$$\min_{\vec{w},b} \frac{1}{2} \langle \vec{w}, \vec{w} \rangle \text{ subject to } y_i(b + \langle \vec{w}, \vec{x}_i \rangle) \geq 1 \text{ for all } 0 \leq i < n \quad (1)$$

Note that in Equation (1), above, b is to be solved as part of the constraint. Equation (1) applies to the case where the training samples are linearly separable. In cases where the samples are not separable or some classification errors are to be allowed for the purpose of avoiding over-training, the SVMs are called soft-margin SVMs, and the following QP problem is formulated and to be solved.

$$\min_{\vec{w},b,\{\xi_i\}} \frac{1}{2} \langle \vec{w}, \vec{w} \rangle + C \sum_{i=0}^{n-1} \xi_i \text{ subject to } y_i(b + \langle \vec{w}, \vec{x}_i \rangle) \geq 1 - \xi_i \text{ for all } 0 \leq i < n. \quad (2)$$

In Equation (2), $\xi_i$ is a slack variable that allows $|f(\vec{x}_i)| < 1$, or even misclassification of $\vec{x}_i$; and C is a constant that weighs the cost of the slackness. The selection of C is often based on heuristics and the target applications.

In cases where non-linear classifiers are needed, Equation (2) can be further modified by using the so-called kernel trick, i.e., replacing the dot product in Equation (1) and Equation (2) by a kernel $K(\cdot, \cdot)$. Since $K(\cdot, \cdot)$ can be interpreted as a dot product in a higher dimensional space, the kernel trick is essentially trying to project the samples into a higher dimensional space where they might become linearly separable. The corresponding QP problem with a kernel $K(\cdot, \cdot)$ is as follows.

$$\min_{\vec{w},b,\{\xi_i\}} \frac{1}{2} K(\vec{w}, \vec{w}) + C \sum_{i=0}^{n-1} \xi_i \text{ subject to } y_i(b + K(\vec{w}, \vec{x}_i)) \geq 1 - \xi_i \text{ for all } 0 \leq i < n. \quad (3)$$

The computational complexity of solving the QP problem can be significant: a brute force implementation has a complexity of $O(n^3)$ where n is the number of training data samples. For applications like video analysis where the number n of training samples (e.g. extracted local features) is large, a SVM training algorithm with low computational complexity is desired and may prove critical in real-time applications.

In accordance with one aspect of the present application, instead of formulating SVM training as a QP problem, a desired hyperplane separating the training samples is found directly. Specifically, the processes described below have linear computational complexity $O(n)$, and are also are highly parallelizable. In some embodiments, the processes described herein are capable of working with dynamic training sets, i.e. sets in which samples are added or removed over time. In some embodiments, the processes described below are better applicable to situations in which the number of training samples is large and the dimensions of each sample are relatively small. The processes below may be suitable for applications like MPEG's Compact Descriptors for Video Analysis (CDVA) that may require online and on-demand training.

Although some of the example embodiments described below are illustrated using two-dimensional (2D) data spaces or three-dimensional (3D) data spaces, it will be appreciated that the present application is not limited to 2D or 3D data spaces and is generally applicable to an n-dimensional data space.

Hard Margin 2D SVM

Consider the 2D data space with n>1 training samples. Let $\{(\vec{x}_i, y_i); 0 \leq i < n\}$ denote the n training samples, where each $\vec{x}_i$ is a 2D vector. Note that since the training samples are separable, there exists a line that separates the positive and negative samples. The goal of SVM training is to find the best hyperplane (in this case, a line), i.e. the line that gives the best possible margin in separating positive and negative samples. Since all training samples are classified correctly, these SVMs are called hard-margin SVMs.

Due to the uncertainty about future samples and the linearity of $f(\vec{x})$, it is not necessary to assume that the solution space for $(\vec{w}, b)$ is continuous. After all, as long as two candidate solutions $(\vec{w}, b)$ and $(\vec{v}, c)$ are sufficiently close, i.e. $\|\vec{w} - \vec{v}\|_1 + |b - c| < \epsilon$, then the resulting models $f_{(\vec{w},b)}(\vec{x})$ and $f_{(\vec{v},c)}(\vec{x})$ are sufficiently close as well, i.e. $|f_{(\vec{w},b)}(\vec{x}) - f_{(\vec{v},c)}(\vec{x})| < (\|\vec{x}\|_1)\epsilon$ for any $\vec{x}$.

A hyperplane/line separating the samples may be referred to as a classification line or classification hyperplane. Each classification line H has two "sibling" lines and $H_-$ and $H_+$ that are parallel to H and to each other. $H_-$ passes through at least one negative sample and $H_+$ passes through at least one positive sample. In this hard margin example, there is no positive or negative sample between $H_-$ and $H_+$. In order to select a classification line as the best classification line, one might select the one whose sibling lines have the greatest distance between them. The classification line may be equidistant between the two sibling lines in some embodiments.

Figure 2:
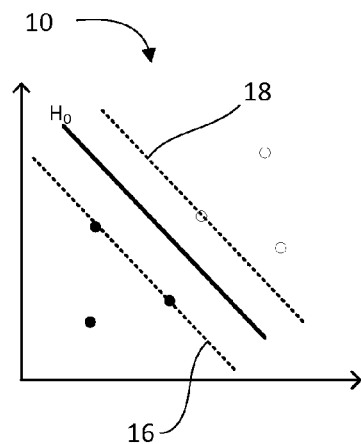
FIG. 2 shows the example data space with sibling hyperplanes.

FIG. 2 illustrates the 2D data space 10 with training samples 12, 14. The hyperplane/line $H_0$ is shown with its two sibling lines 16, 18. Negative sibling line 16 passes through two negative samples 16 and positive sibling line 18 passes through one positive sample 18.

Figure 3:
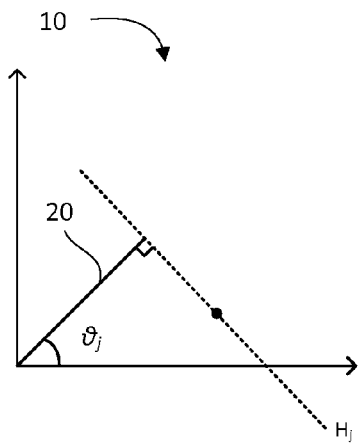
FIG. 3 shows an example polar coordinate system in the data space.

Reference is now made to FIG. 3, which shows the 2D space 10 with a training sample $\vec{x}_i$ having coordinates $(x_{i,0}, x_{i,1})$, i.e. $\vec{x}_i = (x_{i,0}, x_{i,1})$ in the 2D space 10. For every candidate line passing through $\vec{x}_i$, there is a segment normal to the line 20, denoted $\rho_{i,j}$, that extends to the origin and has an angle $\theta_j$. The line 20 may be described as the shortest distance between the candidate line and the origin, i.e. the positive length of a vector from the origin and normal to the candidate line. The line 20 may be referred to herein as a "radial segment", "radial distance" or "radius", in the sense that is the radial length of a segment between the candidate hyperplane and the origin and normal to the candidate hyperplane. The angle $\theta_j$ of the radius may be referred to herein as the "angle vector", the "normal angle" or the "radius angle". The radius is given by:

$$\rho_{i,j} = |<\vec{x}_i, (\cos\theta_j, \sin\theta_j)>| = |x_{i,0}\cos\theta_j + x_{i,1}\sin\theta_j| \quad (4)$$

Figure 4:
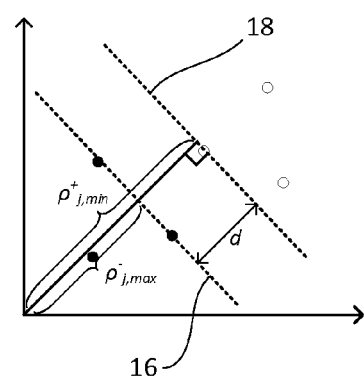
FIG. 4 shows the data space with a radial distance measurement from origin to hyperplane along a normal vector.

Reference is now made to FIG. 4, which shows the 2D space 10 and the training samples 12, 14. The two sibling lines 16, 18 of a classification hyperplane have the same normal angle $\theta_j$, but the radius of the "positive" sibling line 18, $\rho_{i,j}^+$, is a distance d longer than the radius of the "negative sibling line 16, $\rho_{i,j}^-$, since the two sibling lines are parallel and separated by the distance d. The search for an optimal classification hyperplane is carried out as the search for an optimal pair of sibling lines, where the lines are optimal if they maximize d.

One example process involves quantizing the angle space $[0,\pi)$ to create an ordered set of candidate angles $\{\theta_0, \ldots, \theta_{M-1}\}$, where M is a positive integer. Then, for each $\vec{x}_i$, i=0, . . . ,n−1, and for each $\theta_j$, j=0, . . . ,M−1, calculate the radius $\rho_{i,j}$. For every candidate angle $\theta_j$ determine $\rho_{j,min}^-$, $\rho_{j,max}^-$, $\rho_{j,min}^+$, and $\rho_{j,max}^+$, where:

$$\rho_{j,min}^- \triangleq \min_{i: y_i = -1} \rho_{i,j},$$

$$\rho_{j,max}^- \triangleq \max_{i: y_i = -1} \rho_{i,j},$$

$$\rho_{j,min}^+ \triangleq \min_{i: y_i = +1} \rho_{i,j}, \text{ and}$$

$$\rho_{j,max}^+ \triangleq \max_{i: y_i = +1} \rho_{i,j};$$

It will be understood that in a normal training situation, it is not necessarily known whether the "positive" samples will be further from the origin or whether the "negative" samples will be further from the original, so both minimum and maximum radii of both are determined across all samples $\vec{x}_i$. The best distance d corresponding to angle $\theta_j$ is then found as:

$$d_j = \max\{\rho_{j,min}^+ - \rho_{j,max}^-, \rho_{j,min}^- - \rho_{j,max}^+\} \quad (5)$$

From amongst the candidate angles, the optimal one is selected using:

$$j^* = \underset{j}{\operatorname{argmax}} \, d_j \quad (6)$$

which returns $(\theta_{j^*}, \rho_{j^*,min}^-)$ and $(\theta_{j^*}, \rho_{j^*,max}^+)$ as the two sibling lines if $\rho_{j^*,min}^- - \rho_{j^*,max}^- > \rho j^*, \min^+ - \rho_{j^*,max}^+$; otherwise, returns $(\theta_{j^*}, \rho_{j^*,min}^+)$ and $(\theta_{j^*}, \rho_{j^*,max}^-)$ as the two sibling lines.

In some embodiments, Equations (5) and (6) may be implemented together. For instances, in one example the following process may be used:

1. set j=0, compute $d_0$, and set j*=0;
2. increment j by 1;
3. compute $d_j$.
4. If $d_j > d_{j^*}$, then j* is updated to j; otherwise, nothing needs to be done.
5. repeat Steps 2)-4) until j=M−1.

Similarly, in some embodiments, $\rho_{j,min}^-, \rho_{j,max}^-, \rho_{j,min}^+$, and $\rho_{j,max}^+$ are obtained and updated after each $\rho_{i,j}$ is computed.

In some embodiments, the quantization of the angle space is implemented using uniform scalar quantization. For example, $[0,\pi)$ may be quantized into $\{0, 0.5236, 1.0472, 1.5708, 2.0944, 2.6180\}$ with the step size $$\frac{\pi}{6},$$

or $\{0, 0.7854, 1.5708, 2.3562\}$ with the step size $$\frac{\pi}{4}.$$

However, the present application is not limited to these step sizes, or to uniform quantization.

The complexity of the above-described process is O(Mn), mainly due to the complexity of computing $\rho_{i,j}$.

The possible sibling lines or hyperplanes may be referred to as "candidate lines" or "candidate hyperplanes" herein. A pair of "candidate hyperplanes" at the same angle are necessarily parallel to each other and, thus, are sibling lines. The pair of candidate hyperplanes at the same angle that result in an optimal distance d and/or number of samples between them (zero or more), may be selected as the optimal pair of candidate hyperplanes that then serve as sibling hyperplanes for defining the classification hyperplane to be used in the SVM.

Figure 5:
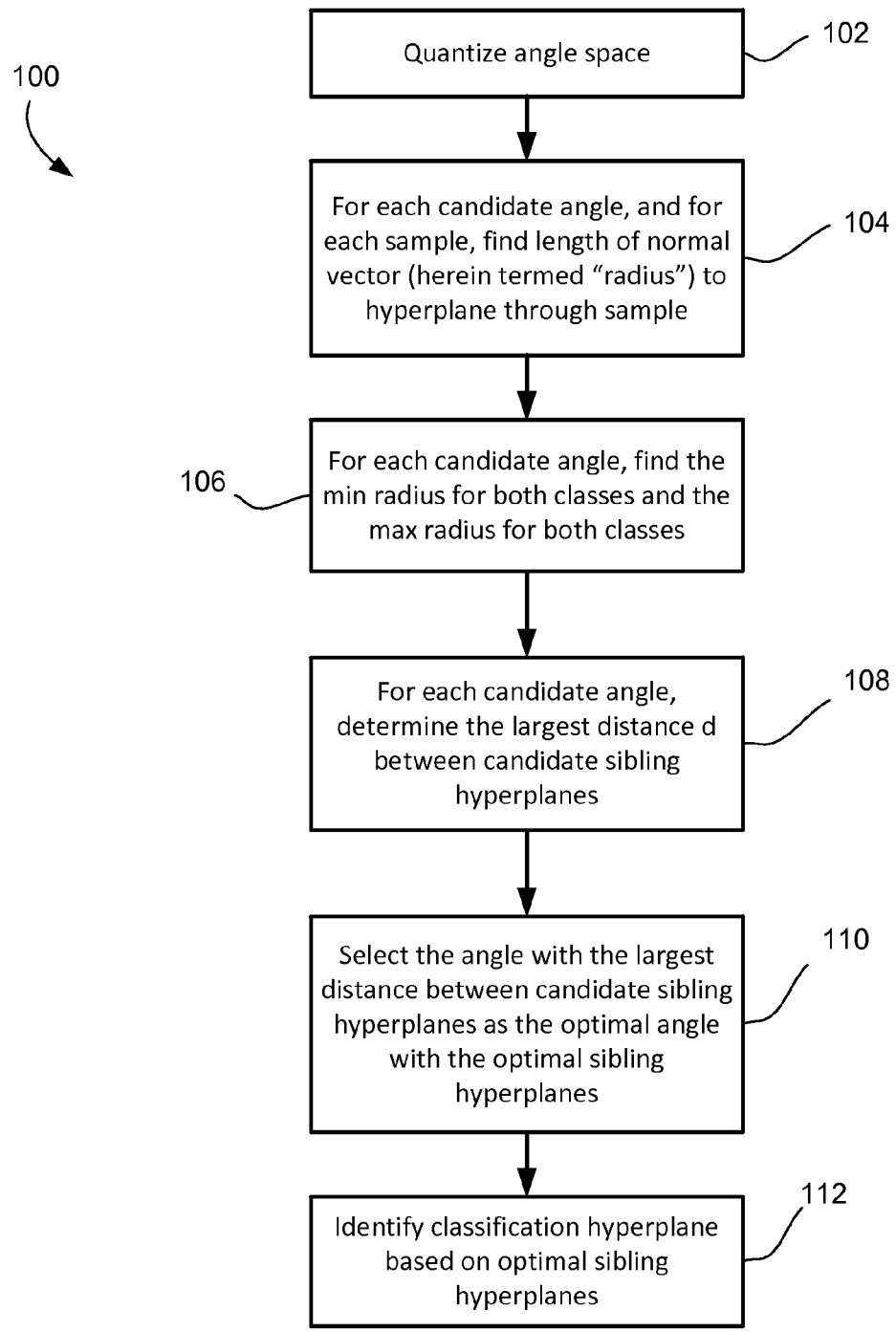
FIG. 5 shows, in flowchart form, one example method of building a support vector machine.

Reference is now made to FIG. 5, which shows, in flowchart form, an example method 100 of building a SVM for classifying a new sample. The method 100 includes first quantizing the angle space in operation 102. As noted above, the quantization may be uniform or non-uniform.

In operation 104, for each candidate angle $\theta_j$, and for each sample $\vec{x}_i$, the length of the radius to a candidate hyperplane passing through the sample is determined. From among all the determined radii at angle $\theta_j$, the minimum and maximum are found for both positive and negative samples, i.e. $\rho_{j,min}^-, \rho_{j,max}^-, \rho_{j,min}^+$, and $\rho_{j,max}^+$, as indicated by operation 106. These maximums and minimums help identify those candidate pairs of hyperplanes that will result in no samples between the pair.

In operations 108 and 110, the radiuses that result in the maximum distance d between pairs of candidate hyperplanes at each angle is found, for example using Equations (5) and (6), above.

In operation 112, the classification hyperplane is then set based upon the optimal angle $\theta_{j^*}$ and the midpoint between the optimal sibling lines (pair of candidate hyperplanes), i.e.

$$\rho = \frac{1}{2}(\rho_1 + \rho_2)$$

wherein $\rho_1 = \rho_{j^*,min}^-$ and $\rho_2 = \rho_{j^*,max}^+$, if $\rho_{j^*,min}^- - \rho_{j^*,max}^+ > \rho_{j^*,min}^+ - \rho_{j^*,max}^-$, and otherwise $\rho_1 = \rho_{j^*,min}^+$ and $\rho_2 = \rho_{j^*,max}^-$.

It will be noted that the process described above works with any training sets, balanced or unbalanced. Recall that traditional QP-based algorithms find the optimal solution $\vec{w}^*$ as a weighted sum of training samples, and thus might subject to bias in an unbalanced training set. In the proposed solution, the search for the two best sibling lines is focused on the opposing boundaries of the positive and negative training samples, and thus is not affected by the number of samples behind those boundaries.

Soft Margin 2D SVM

In hard margin SVM, pairs of candidate hyperplanes are selected on the basis that no sample lies between them. In the example process outlined above, the identification of the maximum and minimum radii for positive and negative classed samples and the evaluation of Equation (5) ensures that the two sibling hyperplanes at a given candidate angle $\theta_j$ pass through the two samples of each class that are closest to each other in the radial direction, meaning there are no samples between the planes.

In soft margin SVM, this constraint is relaxed. This can be done to account for classification errors in the training samples that make the samples not linearly separable, and to lower the risk of overtuning. Instead of explicitly introducing the slack variable, as found in Equation (2), the process described below sets a minimum distance d between the sibling hyperplanes and seeks to minimize the number of samples that falls between that pair of hyperplanes.

In this example process, the angle space is again quantized into an ordered set of candidate angles $\theta_j$. For each candidate angle $\theta_j$, various sibling hyperplane pairs each a distance d apart may be evaluated in a search to find the pair that has the fewest number of samples between them. Note that each candidate hyperplane does not necessarily need to pass through one of the training samples.

In one example embodiment, the hyperplanes passing through the training samples are found and for each class (positive/negative) the hyperplane with the maximum radius and the hyperplane with the minimum radius marks the boundaries of the search space. In other embodiments, different boundaries may be defined. For example, in one embodiment the median radius is one of the boundaries of the search space.

The search space may be quantized candidate hyperplanes using a radial step size $\delta$. In one example implementation, the step size $0 < \delta < d$. In one example, d is an integer multiple of the step size $\delta$ (i.e. $\delta$ partitions d). For each pair of candidate hyperplanes at angle $\theta_j$, the number of samples falling between them is counted. Then, the pair with fewest number of samples between them is identified as the optimal pair of candidate hyperplanes for that angle $\theta_j$. This evaluation is performed for each candidate angle and the angle that produces the pair of hyperplanes with the fewest number of samples between them is selected as the optimal sibling hyperplanes, from which the classification hyperplane is then determined.

The step size $\delta$ may be selected to balance speed with computational complexity. The step size $\delta$ may be constant or may vary based on the angle $\theta_j$. In some cases, the step size $\delta$ may be varied based on the distance between the minimum radius and maximum radius of the class or whatever other measure is used to determine the boundaries of the search space.

Although the above-described process is based on a count of the number of samples "between the pair of hyperplanes", it will be appreciated that the process may be modified to be based upon determining the number of samples on the "wrong" side of their respective hyperplane. That is, count the number of training samples of a class that are supposed to be "below" a hyperplane but are actually "above" the hyperplane, including those that are even beyond the other sibling hyperplane (i.e. outside the space between the hyperplanes).

Figure 6:
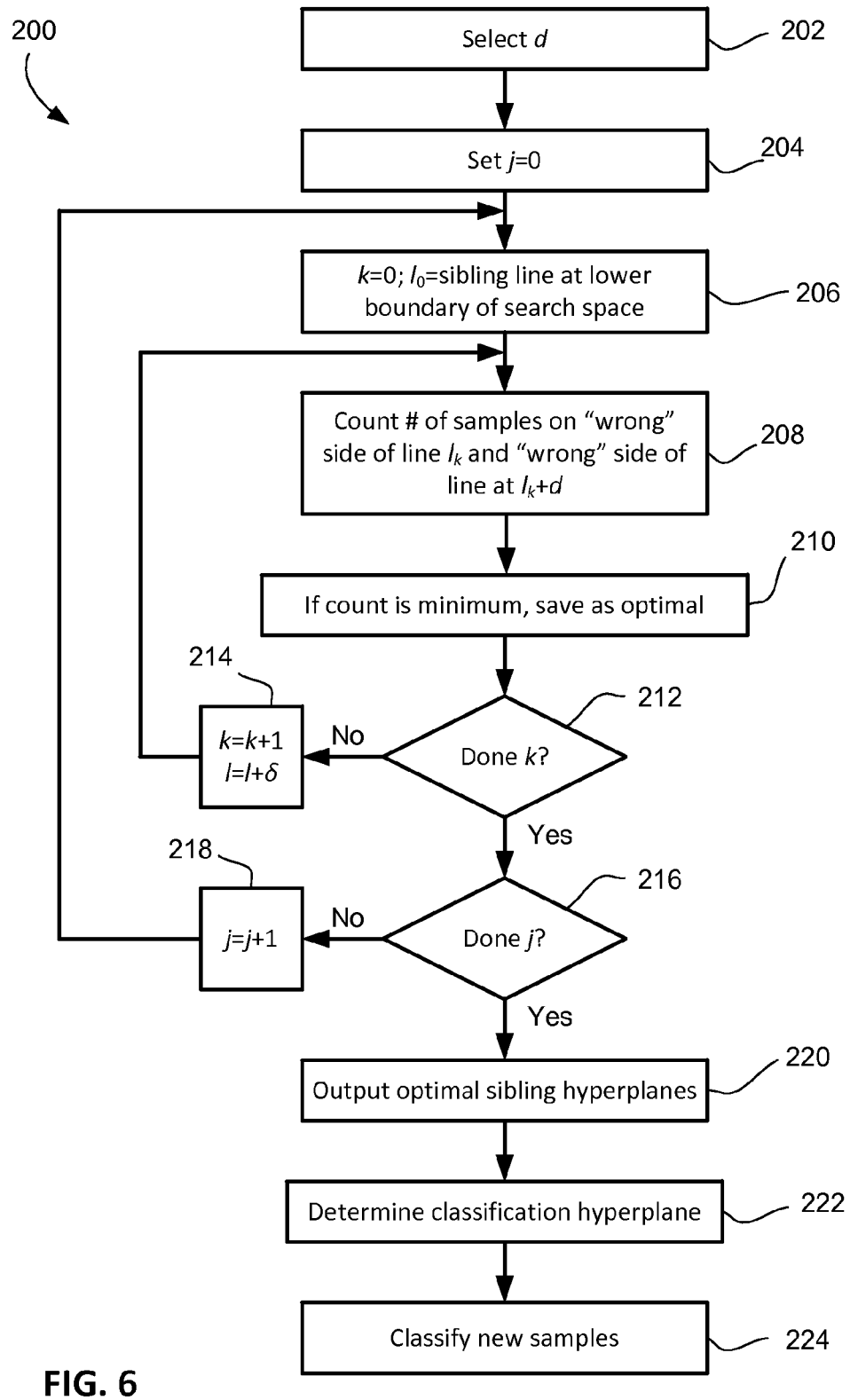
FIG. 6 shows, in flowchart form, another example method of building a support vector machine.

FIG. 6 shows, in flowchart form, one example method 200 for building a soft margin SVM for classifying a new sample. In operation 202, a distance d between the pairs of hyperplanes is selected. The distance d may be selected based upon target application requirements (e.g. desired robustness in classification performance) and/or knowledge about the training data (e.g. statistical variation). Note that as the distance d grows, the trained SVMs become less sensitive to the training samples near the boundary of the decision plane, i.e., the samples in the region between the pairs of hyperplanes.

In operation 204, index j is initialized to zero. Index j steps through the candidate angles $\theta_j$. In operation 206, index k is initialized to zero and a length variable $l_k$ is initialized to the lower boundary of the search space. The length variable is a radius length $\rho_{i,j}$ for the candidate sibling hyperplane closest to the origin, and $l_k + d$ is the radius length for its sibling. The initial length $l_0$ is set by the boundary of the search space. In one embodiment the lower boundary may be the minimum radius $\rho_{i,j}$ from among all samples $\vec{x}_i$. In other embodiments, the lower boundary may be selected in another manner, such as the median radius of one of the classes, an average radius of one of the classes, or some other suitable starting point for the search space.

In operation 208, a count of the number of samples on the "wrong" side of the respective hyperplanes is determined. Because it is not necessarily known which hyperplane corresponds to which class, the count may be determined for both options. In one example, for k=0, the count C is assessed as:

$$C_0^- = |\{i : y_i = -1 \& \rho_{i,j} > l_0\}| + |\{i : y_i = +1 \& \rho_{i,j} < l_0 + d\}|$$

$$C_0^+ = |\{i : y_i = -1 \& \rho_{i,j} > l_0\}| + |\{i : y_i = -1 \& \rho_{i,j} < l_0 + d\}|$$

The count value that is a minimum is stored as the minimum count $C_{j,min}$. For k=0, the minimum count may be initialized by storing: $C_{j,min} = \min\{C_0^-, C_0^+\}$. Likewise, at k=0, the index is stored as corresponding to the minimum count: $k_{j,min} = 0$.

As indicated by operation 210, in subsequent iterations, the minimum count and minimum index values are overwritten if a count is determined that is smaller than the currently-stored minimum count.

In operation 212, the method 200 evaluates whether the search space is finished. If not, then index k is incremented and radius length l is increased by the step size $\delta$ in operation 214. Subsequent iterations of operation 208 may evaluate the expressions:

$$C_k^- = |\{i : y_i = -1 \& \rho_{i,j} > l_k\}| + |\{i : y_i = +1 \& \rho_{i,j} < l_k + d\}|$$

$$C_k^+ = |\{i : y_i = +1 \& \rho_{i,j} > l_k\}| + |\{i : y_i = -1 \& \rho_{i,j} < l_k + d\}|$$

Once the search space has been traversed, then in operation 218 the method 200 assesses whether all the angles have been evaluated. If not, then j is incremented in operation 218 and the method 200 returns to operation 206. Otherwise, in operation 220, the optimal sibling hyperplanes are output on the basis that they resulted in the minimum count found across all candidate angles. In operation 222, a classification hyperplane is defined based upon the optimal sibling hyperplanes and in operation 224, that classification hyperplane is used by the SVM in the classification of new samples.

In some embodiments, the computation of $C_k^-$ and $C_k^+$, respectively, in operation 208, is implemented by adding the respective incremental changes to $C_{k-1}^-$ and $C_{k-1}^+$, respectively, to save computational complexity. That is:

$$C_k^- = C_{k-1}^- - |\{i: y_i = -1 \& l_{k-1} < \rho_{i,j} \leq l_k\}| + |\{i: y_i = +1 \& l_{k-1} + d \leq \rho_{i,j} > l_k + d\}|$$

$$C_k^+ = C_{k-1}^+ - |\{i: y_i = +1 \& l_{k-1} < \rho_{i,j} \leq l_k\}| + |\{i: y_i = -1 \& l_{k-1} + d \leq \rho_{i,j} < l_k + d\}|$$

In another embodiment, rather than fixing d, the distance d between the sibling hyperplanes (or, rather, its inverse) and the number of samples between the sibling hyperplanes (or a count of those samples on the "wrong" side of their hyperplane) may be made variables in a joint cost optimization expression. By finding a minimum joint cost, the optimal d and hyperplanes may be selected.

3D and Above

The processes described above in connection with 2D examples may be extended to 3D or higher-dimension data spaces. In a 3D or higher-dimension space, each training sample $\vec{x}_i$ is an N-tuple, i.e., has N elements, wherein N is an integer larger than 2.

In the case of hard margin SVM, the candidate sibling hyperplanes will have the same conditions as were defined above in the 2D case, e.g. they are parallel to each other, one passes through at least one negative sample and the other passes through at least one positive sample, and there are no samples between the hyperplanes. The search for optimal sibling hyperplaces is again a search for the candidate sibling hyperplanes that are a maximum distance apart.

The polar coordinate system is extended to an N-dimensional space (e.g. a spherical coordinate system in a 3D space). Specifically, $\{\vec{e}_0, \ldots, \vec{e}_{N-1}\}$ denote an orthonormal basis of the N-dimensional space. Then any hyperplane H can be uniquely represented by an N-tuple $\vec{\theta} = (\theta_0, \ldots, \theta_{N-1})$ and a radius $\rho$ such that:

$$\sum_{k=0}^{N-1} \cos^2 \theta_k = 1.$$

Note that the sum constraint on $\vec{\theta}$ indicates that the dimension of $\vec{\theta}$ is N−1. Using a ($\vec{\theta}, \rho$) representation of a hyperplane, the hard margin process described above is modified to map the angle space $[0,\pi) \times [0,2\pi)^{N-2}$ into an ordered set $\{\vec{\theta}_0, \ldots, \vec{\theta}_{M-1}\}$. In all remaining operations, the same process is carried out but using $\vec{\theta}_j$ for $\theta_j$.

The same extension may be applied to the soft margin process for extending it to higher-dimensional data space.

The above-described hard and soft margin processes may be modified to balance computational complexity and accuracy through various optional refinements or modifications.

Successive Angle Vector Refinement

It will be noted that in order to maintain accuracy in mapping the angle space to a discrete set, the set size M grows exponentially with respect to the number N of dimensions. When N is large, M might become too large to be practical. To address this issue, in one embodiment the angle space may be "successively refined". In particular, using the example of hard margin SVMs, first find an optimal angle vector $\vec{\theta}_{j*}$ and corresponding sibling hyperplanes using a coarse quantization of the angle space. Then successively refine that optimal angle vector using finer quantization of a smaller angle space centered around the optimal angle vector.

For example, the hard margin SVM building process may be modified as follows:

1. Initialize a counter $\tau$ to 0, and select a positive integer $M^{(0)}$ based on an accuracy level $q^{(0)}$, e.g. a quantization step size. Let $V^{(0)}$ denote the angle space $[0,\pi) \times [0,2\pi)^{N-2}$.

2. Map $V^{(\tau)}$ to an ordered set $\Theta^{(\tau)} = \{\vec{\theta}_0, \ldots, \vec{\theta}_{M^{(\tau)}-1}\}$ according to $q^{(\tau)}$. One way to construct $\Theta^{(\tau)}$ is to use uniform scalar quantization on each dimension with step size $q^{(\tau)}$. In this way, for any $\vec{\theta}$ in $V^{(\tau)}$, there is a member in $\Theta^{(\tau)}$ that is within L1 distance of $$\frac{(N-1)q^{(\tau)}}{2}$$

of $\vec{\theta}$.

3. Perform the hard margin SVM building process to determine the optimal angle vector $\vec{\theta}_{j*}^{(\tau)}$.

4. Increment $\tau$ by 1, and select a new positive integer $M^{(\tau)}$ based on a new accuracy level $q^{(\tau)} < q^{(\tau-1)}$. In one example, $q^{(\tau)} = \alpha q^{(\tau-1)}$, where $\alpha$ is a positive constant less than 1. Update $V^{(\tau)}$ to be an L1 ball centred at $\vec{\theta}_{j*}^{(\tau-1)}$ given by $$\left\{\vec{\theta}: \left\|\vec{\theta} - \vec{\theta}_{j*}^{(\tau-1)}\right\|_1 \leq \frac{(N-1)q^{(\tau-1)}}{2}\right\}.$$

5. Repeat operations 2-4 until desired accuracy is achieved, i.e., $q_{(\tau-1)}$ is lower than a prescribed threshold, or the change between $\vec{\theta}_{j*}^{(\tau)}$ and $\vec{\theta}_{j*}^{(\tau-1)}$ is less than a threshold value.

In one variation of the above embodiment, there might be other angle vectors in $\Theta^{(\tau)}$ that tie with $\vec{\theta}_{j*}^{(\tau)}$ in terms of margin. In these cases, a union of all the L1 balls centred at all these angle vectors may be used to construct $V^{(\tau)}$.

Similar modifications may be made to the soft margin SVM building process to implement successive refinement in that process.

Further Parameter Quantization

In the above-described training processes, a hyperplane is uniquely identified by an angle vector $\vec{\theta}$ and a radius $\rho$ (the radius being normal to the hyperplane). If the hyperplane is in an N-dimensional space, then the dimensions of $\vec{\theta}$ is N−1. To facilitate the training process, the parameter space of $\vec{\theta}$ is quantized and mapped to a finite set. However, in the examples descried above, the parameter $\rho$ has not been quantized and can take any positive real value in $(0,\infty)$. In some further embodiments, to simplify the search, the processes may map $\rho$ into a finite set, e.g. $\{r_0, \ldots, r_{L-1}\}$. One consequence of having both $\vec{\theta}$ and $\rho$ to take values in finite sets is that the whole parameter space may now be represented by an MxL matrix P, where each entry corresponds to a hyperplane.

One example implementation of this quantized parameter space in hard margin SVM construction is described below.

Suppose that $\{(\vec{x}_i, y_i); 0 \leq i < n\}$ are the training samples, where each $\vec{x}_i$ is an N-dimensional vector. The following operations may be carried out to build a hard margin SVM:

1. Map the angle space $[0,\pi) \times [0,2\pi)^{N-2}$ in to an ordered set $\{\vec{\theta}_0, \ldots, \vec{\theta}_{M-1}\}$, where M is a positive integer. Initialize two MxL matrices with zeros:

$$P^+ = \begin{bmatrix} p^+_{0,0} & \cdots & p^+_{0,L-1} \\ \vdots & \ddots & \vdots \\ p^+_{M-1,0} & \cdots & p^+_{M-1,L-1} \end{bmatrix}$$

$$P^- = \begin{bmatrix} p^-_{0,0} & \cdots & p^-_{0,L-1} \\ \vdots & \ddots & \vdots \\ p^-_{M-1,0} & \cdots & p^-_{M-1,L-1} \end{bmatrix}$$

2. Let Q denote a mapping from $(0,\infty)$ to an ordered set $\{r_0, \ldots, r_{L-1}\}$, where each $r_k$, $0 \leq k < L$, is a positive real number, and $r_k < r_l$ for any $0 \leq k < l < L$.

3. For each $\vec{x}_i$, $i=0, \ldots, n-1$, and for each $\vec{\theta}_j$, $j=0, \ldots, M-1$, calculate the radius $\rho_{i,j}$ of the hyperplane that passes $\vec{x}_i$ and whose angle vector is $\vec{\theta}_j$ according to $\rho_{i,j} = |<\vec{x}_i, \vec{\theta}_j>|$, and increment $p^+_{j,Q(\rho_{i,j})}$ in $P^+$ by 1 if $y_i=+1$ or $p^-_{j,Q(\rho_{i,j})}$ in $P^-$ by 1 if $y_i=-1$.

4. For each $\vec{\theta}_j$:
(a) search from left to right in $p^-_{j,0} \ldots p^-_{j,L-1}$ to find the first nonzero entry at position $l^-_{min}$ and the last nonzero entry at position $l^-_{max}$, and store $\rho^-_{j,min} = r_{l^-_{min}}$, $\rho^-_{j,max} = r_{l^-_{min}}$.
(b) search from left to right in $p^+_{j,0} \ldots p^+_{j,L-1}$ to find the first nonzero entry at position $l^+_{min}$ and the last nonzero entry at position $l^+_{max}$, and store $\rho^+_{j,min} = r_{l^+_{min}}$, $\rho^+_{j,max} = r_{l^+_{min}}$.
(c) compute and store $d_j = \max\{\rho^+_{j,min} - \rho^-_{j,max}, \rho^-_{j,min} - \rho^+_{j,max}\}$.

5. Determine $j^* = \arg\max_j d_j$, and return $(\theta_{j^*}, \rho^-_{j^*,min})$ and $(\theta_{j^*}, \rho^+_{j^*,max})$ as the two sibling hyperplanes if $\rho^-_{j^*,min} - \rho^+_{j^*,max} > \rho^+_{j^*,min} - \rho^-_{j^*,max}$; otherwise, return $(\theta_{j^*}, \rho^+_{j^*,min})$ and $(\theta_{j^*}, \rho^-_{j^*,max})$ as the two sibling hyperplanes.

Another example implementation of this quantized parameter space, using soft margin SVM construction in this case, is described below.

1. Map the angle space $[0,\pi) \times [0,2\pi)^{N-2}$ in to an ordered set $\{\vec{\theta}_0, \ldots, \vec{\theta}_{M-1}\}$, where M is a positive integer. Initialize two MxL matrices with zeros:

$$P^+ = \begin{bmatrix} p^+_{0,0} & \cdots & p^+_{0,L-1} \\ \vdots & \ddots & \vdots \\ p^+_{M-1,0} & \cdots & p^+_{M-1,L-1} \end{bmatrix}$$

$$P^- = \begin{bmatrix} p^-_{0,0} & \cdots & p^-_{0,L-1} \\ \vdots & \ddots & \vdots \\ p^-_{M-1,0} & \cdots & p^-_{M-1,L-1} \end{bmatrix}$$

2. Let Q denote a mapping from $(0, \infty)$ to an ordered set $\{r_0, \ldots, r_{L-1}\}$, where each $r_k$, $0 \leq k < L$, is a positive real number, and $r_{k+1} = r_k + \delta$ for any $0 \leq k < L-1$, where $\delta$ is a positive constant that divides d.

3. For each $\vec{x}_i$, $i=0, \ldots, n-1$, and for each $\vec{\theta}_j$, $j=0, \ldots, M-1$, calculate the radius $\rho_{i,j}$ of the hyperplane that passes $\vec{x}_i$ and whose angle vector is $\vec{\theta}_j$ according to $\rho_{i,j} = |<\vec{x}_i, \vec{\theta}_j>|$, and increment $p^+_{j,Q(\rho_{i,j})}$ in $P^+$ by 1 if $y_i=+1$ or $p^-_{j,Q(\rho_{i,j})}$ in $P^-$ by 1 if $y_i=-1$.

4. For each $\theta_j$, do the following. For brevity, denote $d/\delta$ by t.
(a) Initialize a counter $k=0$, and compute $C_0^- = \sum_{l=k+1}^{L-1} p^-_{j,l} + \sum_{l=0}^{k+t-1} p^-_{j,l}$ and $C_0^+ = \sum_{l=k+1}^{L-1} p^+_{j,l} + \sum_{l=0}^{k+t-1} p^+_{j,l}$. Store $C_{j,min} = \min\{C_0^-, C_0^+\}$ and $k_{j,min} = 0$.
(b) Increment k by 1.
(c) Update $C_k^- = \sum_{l=k+1}^{L-1} p^-_{j,l} + \sum_{l=0}^{k+t-1} p^-_{j,l} = C_{k-1}^- - p^-_{j,k} + p^-_{j,k+t-1}$ and $C_k^+ = \sum_{l=k+1}^{L-1} p^+_{j,l} + \sum_{l=0}^{k+t-1} p^+_{j,l} = C_{k-1}^+ - p^+_{j,k} + p^+_{j,k+t-1}$. If $\min\{C_k^-, C_k^+\} < C_{min}$, then update $C_{j,min} = \min\{C_k^-, C_k^+\}$, and $k_{j,min} = k$.
(d) Repeat operations (b) and (c) until $k \geq L-1-t$.

5. Determine $j^* = \arg\min_j C_{j,min}$, and return $(\theta_{j^*}, r_{k_{j^*,min}})$ and $(\theta_{j^*}, r_{k_{j^*,min}+t})$ as the two sibling hyperplanes.

Dynamic Training Set Adaptation

In the above examples, the training sets are presumed to be static and the static training sets are used to determine a classification hyperplane that is then used to classify new samples. However, in some applications it may be desirable to allow for dynamic training sets; i.e. to refine or adapt the determination of the classification hyperplane over time as new training samples are generated or old training samples are removed from the set. It would further be advantageous if the refinement/adaptation would avoid re-executing the entire SVM building process each time there is a new training sample or a removed training sample.

The following example processes build upon the above examples involving a quantized parameter space, wherein the matrices P+ and P- are used to store the counts of the quantized radii that correspond to hyperplanes through the training samples at the various candidate angle vectors. Because the matrices retain all the calculated counts, the refinement processes need only account for the presence of a new sample or the removal of a sample.

For example, in the case of hard margin SVM using a quantized parameter space, a new sample is dealt with by determining the radius of a hyperplane passing through the sample at each of the candidate angle vectors and, for each hyperplane, mapping the radius to the quantized parameter space and incrementing the corresponding matrix value. Note that only one of the matrices is updated since the new training sample is either $y=-1$ or $y=+1$. The search through the matrix for the optimal radius for each angle vector is then carried out for the updated matrix and, if $d_j$ has changed, then new sibling hyperplanes are returned.

With reference to the above-described hard margin SVM process with a quantized parameter space, the following example process may be used to update the SVM to account for a new sample $(\vec{x}_n, y_n)$:

1. Let i=n.

2. For each $\vec{\theta}_j$, j=0, ...,M−1, calculate the radius $\rho_{i,j}$ of the hyperplane that passes $\vec{x}_i$ and whose angle vector is $\vec{\theta}_j$ according to $\rho_{i,j}=|<\vec{x}_i,\vec{\theta}_j>|$, and decrement $p_{j,Q(\rho_{i,j})}^+$ in $P^+$ by 1 if $y_i=+1$ or $p_{j,Q(\rho_{i,j})}^-$ in $P^-$ by 1 if $y_i=-1$.

3. Perform either operation 4(a)(if $y_i=-1$) or operation 4(b)(if $y_i=+1$) to identify the minimum and maximum radii for both classes, then determine whether the resulting minimum/maximum radii are the same as before or whether they have changed, i.e. is $d_j$ the same? If changed, then determine the corresponding sibling hyperplanes as in operation 5, above.

With reference again to the example hard margin SVM process with a quantized parameter space, the following example process may be used to update the SVM to account for removal of the sample $(\vec{x}_0, y_0)$:

1. Let i=0.

2. For each $\vec{\theta}_j$, j=0, ...,M−1, calculate the radius $\rho_{i,j}$ of the hyperplane that passes $\vec{x}_i$ and whose angle vector is $\vec{\theta}_j$ according to $\rho_{i,j}=|<\vec{x}_i,\vec{\theta}_j>|$, and decrement $p_{j,Q(\rho_{i,j})}^+$ in $P^+$ by 1 if $y_i=+1$ or $p_{j,Q(\rho_{i,j})}^-$ in $P^-$ by 1 if $y_i=-1$.

3. Perform either operation 4(a)(if $y_i=-1$) or operation 4(b)(if $y_i=+1$) to identify the minimum and maximum radii for both classes, then determine whether the resulting minimum/maximum radii are the same as before or whether they have changed, i.e. is $d_j$ the same? If changed, then determine the corresponding sibling hyperplanes as in operation 5, above.

Yet another situation is that a training sample is re-classified. For example it may be reclassified from positive to negative. In such a case, a similar approach is used to determine the hyperplane corresponding to each candidate angle vector and to update both the matrices, i.e. increment an element of one matrix and decrement the corresponding element in the other matrix. Operation 4 for finding the sibling hyperplanes is then carried out. In the case of a re-classified training sample, both operations 4(a) and 4(b) are performed since both matrices have been altered by the change.

Adapting the SVM to account for addition or removal of training samples can also be applied to the case of soft margin SVMs. The following examples again presume use of a quantized parameter space and the P matrices. To add new sample $(\vec{x}_n, y_n)$ the following operations may be carried out:

1. Let i=n.

2. For each $\vec{\theta}_j$, j=0, ...,M−1, calculate the radius $\rho_{i,j}$ of the hyperplane that passes $\vec{x}_i$ and whose angle vector is $\vec{\theta}_j$ according to $\rho_{i,j}=|<\vec{x}_i,\vec{\theta}_j>|$, and increment $p_{j,Q(\rho_{i,j})}^+$ in $P^+$ by 1 if $y_i=+1$ or $p_{j,Q(\rho_{i,j})}^-$ in $P^-$ by 1 if $y_i=-1$.

3. Perform operations 4 and 5 to update the SVM.

The removal of sample $(\vec{x}_0, y_0)$ may be implemented using the following example operations:

1. Let i=0.

2. For each $\vec{\theta}_j$, j=0, ...,M−1, calculate the radius $\rho_{i,j}$ of the hyperplane that passes $\vec{x}_i$ and whose angle vector is $\vec{\theta}_j$ according to $\rho_{i,j}=|<\vec{x}_i,\vec{\theta}_j>|$, and decrement $p_{j,Q(\rho_{i,j})}^+$ in $P^+$ by 1 if $y_i=+1$ or $p_{j,Q(\rho_{i,j})}^-$ in $P^-$ by 1 if $y_i=-1$.

3. Perform operations 4 and 5 to update the SVM.

Reclassification of an existing sample involves the following operation:

For each $\vec{\theta}_j$, j=0, ...,M−1, calculate the radius $\rho_{i,j}$ of the hyperplane that passes $\vec{x}_i$ and whose angle vector is $\vec{\theta}_j$ according to $\rho_{i,j}=|<\vec{x}_i,\vec{\theta}_j>|$, and decrement $p_{j,Q(\rho_{i,j})}^+$ in $P^+$ by 1 and increment $p_{j,Q(\rho_{i,j})}^-$ in $P^-$ by 1. Then perform operations 4 and 5 to update the SVM.

Parallel Implementation

In general, the above-described processes lend themselves to parallel implementation. For example, in the case of the hard margin SVM first described above, the computation of $\rho_{i,j}$ for $(\vec{x}_i, \theta_j)$ is independent of any other $\rho_{i',j'}$ where $(i,j) \neq (i',j')$, which indicates that L>1 computing units may be used to compute L different $\rho_{i,j}$ simultaneously.

In one example embodiment, L computing units are used where the ith unit is used to compute $\{\rho_{i,j}; j=0, ..., M-1\}$ for $\vec{x}_i, \vec{x}_{i+L}, \vec{x}_{i+2L}, \ldots$. In this case, each sample $\vec{x}_i$ remains within one computing unit and thus the bandwidth of moving $\vec{x}_i$ among different computing units is saved.

In another example embodiment, L computing units are used where the jth unit is used to compute $\{\rho_{i,j}; i=0, ..., n-1\}$ for $\vec{\theta}_j, \vec{\theta}_{j+L}, \vec{\theta}_{j+2L}, \ldots$. In this case, each angle $\vec{\theta}_j$ remains within one computing unit and thus the subsequent search for $\rho_{j,min}^-, \rho_{j,max}^-, \rho_{j,min}^+$, and $\rho_{j,max}^+$ is within the computing unit, saving the bandwidth cost of moving $\rho_{i,j}$ among different computing units.

Applications

The above-described example processes for building and/or modifying an SVM may be applied to a number of classification problems. Examples include CDVA, medical data analysis and online image classification, voice quality rankings or other user feedback situations. CDVA, in particular, involves the standardization of descriptors as Compact Descriptors for Video Analysis. An analyzer produces a compact representation of a video to be interpreted by a CDVA decoder. The application for CDVA may include classification of media and entertainment, for example. In some cases, CDVA may be applied to real-time object classification and identification. CDVA may have application to automotive driver assistance or driver-less operation. Object classification in images or video is a challenge that may be broken down into binary classification decisions regarding a sample based on a database of training samples. CDVA may also benefit from online addition or removal of training samples for refining the classifier.

In the context of classifying objects in image and video data, a supervised or a semi-supervised system provides training samples as input to train a classifier or a classification engine/machine. A training sample can be a matrix of pixels with a class label, or descriptors extracted from such a matrix. Typical examples of binary class labels include: representing a human face or not, including a person or not, including a car object or not, representing a finger print or not, including a man-made object or not, etc. Typical examples of extracted descriptors include a quantized DCT coefficient matrix, a matrix of quantized color values, SIFT (scale-invariant feature transform) descriptors as described by D. G. Lowe in "Distinctive image features from scale-invariant keypoints", *International Journal of Computer Vision,* pp. 91-110, 2004, and their variants, minutiae in biometrics, etc.

Ongoing training and classification may also be useful for classifiers in real-time or near real-time feedback systems, such as online services in which users can provide positive or negative quality assessments. Such user assessments, together with data capturing corresponding system parameters and running status, provide training samples that allow a classifier to be built to help identify important parameters to tune, and/or predict future user experience given a current system status. For example, in a typical voice over IP (internet protocol) application, user feedback ranking the call quality may be used to build training samples along with performance data and system parameters like communication bandwidth, signal-to-background noise ratio, echo cancellation settings, speaker phone on/off, packet loss rate, etc.

Other applications will be appreciated by those skilled in the art.

Generalized SVM Construction

Figure 7:
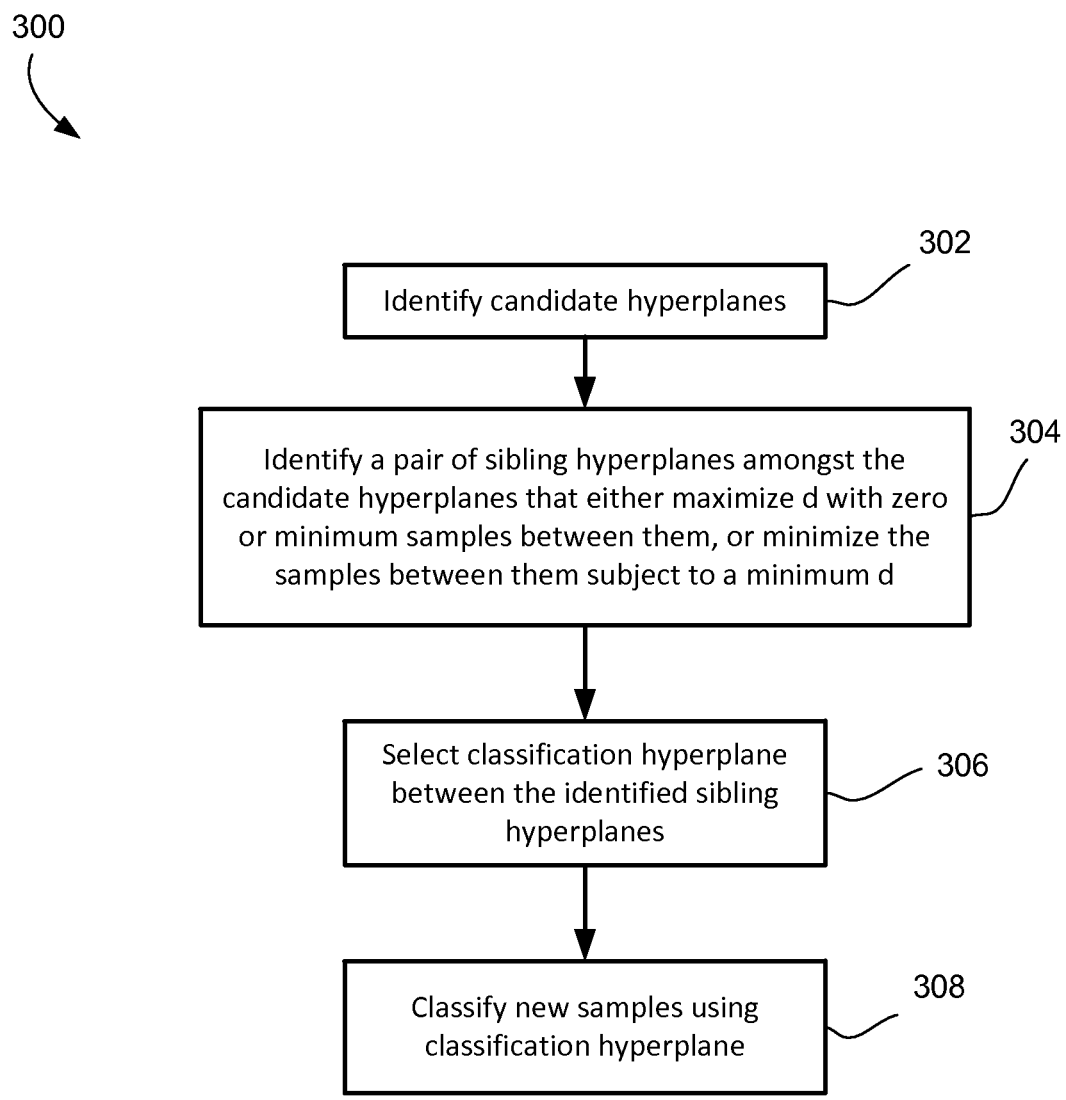
FIG. 7 shows, in flowchart form, yet a further example method of building a support vector machine.

Reference is made to FIG. 7, which shows, in flowchart form, a generalized process 300 for SVM construction. The process 300 includes an operation 302 of finding candidate sibling hyperplane pairs. As noted in the above examples, the mechanisms for determining the candidate sibling hyperplane pairs may include defining them along a radius normal to the hyperplanes and at a candidate angle vector to the origin in a coordinate system. In some cases, the angle space is quantized. In some cases, the candidate radii are quantized. The search may be based on hard margin or soft margin.

In operation 304, the optimal candidate sibling hyperplane pair is selected. In one embodiment, this selection may be on the basis that it maximized the distance between the pair of hyperplanes while ensuring no samples fall between them, i.e. hard margin. In another embodiment, this selection may be on the basis that it minimizes the number of training samples between the pair of hyperplanes while ensuring that the hyperplanes are at least a minimum distance apart, i.e. soft margin. In yet another embodiment, the selection is based on a joint cost optimization expression that attempts to balance the maximization of the distance between the hyperplanes with the minimization of the number of samples between the hyperplanes.

In operation 306, having selected the optimal sibling hyperplanes, a classification hyperplane is then determined based upon the optimal sibling hyperplanes. In one embodiment, the classification hyperplane is parallel to, and equidistant between the two sibling hyperplanes. In another embodiment, the classification hyperplane is between the two sibling hyperplanes, but not necessarily equidistant between them. For example, if there are more positive (or negative) samples between the optimal sibling hyperplanes, the classification hyperplane may be placed closer to the negative (or positive, respectively) samples, and is thus no longer equidistant between the two sibling hyperplanes.

In operation 308, new samples are classified using the classification hyperplane.

It will further be understood that the SVM may be updated or refined, without having to run the full construction process, as new training sample data is received, old training samples are removed, or old training samples are reclassified.

Figure 8:
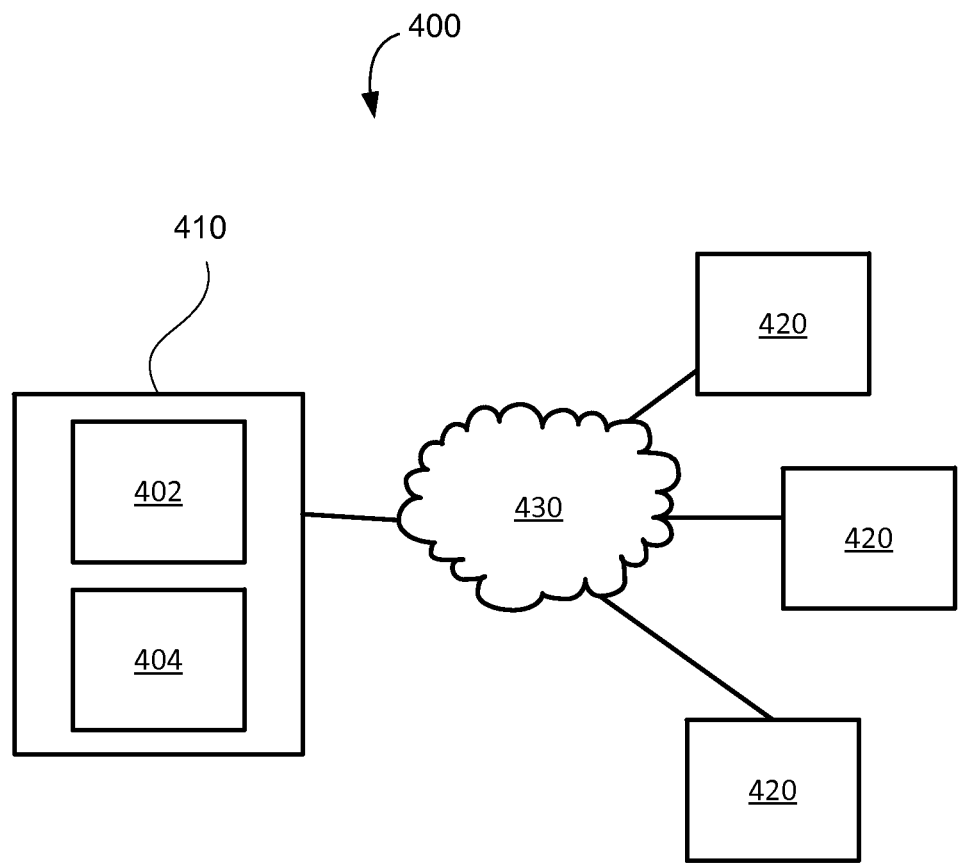
FIG. 8 shows a block diagram of one embodiment of a system for building and implementing a support vector machine.

Reference is now also made to FIG. 8, which shows, in block diagram form, one example system 400 for implementation of one of the above-described example processes. The system 400 may include a computing device 410 having one or more processors 402 and memory 404. The processor(s) 402 execute processor-readable instructions to carry out the operations of the example process for building an SVM. The computing device 410 may include a mobile device, such as a smartphone, tablet, laptop, smartwatch, wearable computing device, or any other such mobile computing device. The computing device 410 may also include any other type of computing device, including a computer, server, or a special-purpose computing device.

In some cases, the system 400 may include one or more remote device 420 configured to communicate with the computing device 410 over one or more wired or wireless networks 430. Any one or more of the operations of a given process may be carried out by one or more of the remote devices 420 and the results provided to the computing device 410. The remote devices 420 may include servers, computers, mobile devices, or any other such computing elements.

It will be appreciated that the processes and systems according to the present application may be implemented in a number of computing devices, including, without limitation, servers, suitably-programmed general purpose computers, and mobile devices. The processes may be implemented by way of software containing instructions for configuring a processor or processors to carry out the functions described herein. The software instructions may be stored on any suitable non-transitory computer-readable memory, including CDs, RAM, ROM, Flash memory, etc.

It will be understood that the devices described herein and the module, routine, process, thread, or other software components implementing the described methods/processes may be realized using standard computer programming techniques and languages. The present application is not limited to particular processors, computer languages, computer programming conventions, data structures, other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A method of classifying a portion of an image or video using a classifier, the classifier being based upon a set of samples in a data space, wherein each sample of the set of samples comprises classified image data, wherein the set includes a plurality of samples of one class and a plurality of samples of another class, and wherein the portion of the image or video comprises a new sample in the data space, the method comprising:
training the classifier by:
mapping an angle space to a fixed set of angle vectors and,
for each angle vector,
finding, for each sample, a candidate hyperplane associated with that angle vector, wherein each candidate hyperplane is a radial distance from an origin point measured along a vector from the origin and normal to the candidate hyperplane, and wherein the direction of the vector is given by the angle vector in the data space;
selecting, as an optimal pair of hyperplanes, a pair of the candidate hyperplanes associated with one angle vector of the first set of angle vectors on the basis of a distance between pairs of the candidate hyperplanes parallel to each other and the number of samples between the candidate hyperplanes; and determining a classification hyperplane as a hyperplane parallel to and between the optimal pair of hyperplanes, and determining whether the portion of the image or video is in the one class or in the another class based on which side of the classification hyperplane the new sample is located.

2. The method claimed in claim 1, wherein, each candidate hyperplane passes through at least one of the samples of one of the classes, and wherein selecting comprises selecting the optimal pair of hyperplanes on the basis that they have the largest distance between them among all pairs of candidate hyperplanes that have no samples between them.

3. The method claimed in claim 1, wherein, each candidate hyperplane passes through at least one of the samples of one of the classes, the distance is fixed, and wherein selecting comprises selecting the optimal pair of hyperplanes on the basis that they have the fewest number of samples between them among all pairs of candidate hyperplanes.

4. The method claimed in claim 1, wherein, for each candidate hyperplane, its radial distance is mapped to a fixed set of radial distances.

5. The method claimed in claim 4, wherein identifying comprises building a first matrix for the one class and a second matrix for the another class, and wherein the matrices contains counts corresponding to candidate hyperplanes corresponding to a sample of that respective class at a particular angle vector and radius.

6. The method claimed in claim 1, further comprising outputting the classification determination.

7. The method claimed in claim 1, further comprising receiving new classified image data which comprises a new training sample, determining additional candidate hyperplanes corresponding to the new training sample, determining whether the additional candidate hyperplanes result in selection of a new optimal pair of hyperplanes and, if so, determining an updated classification hyperplane.

8. The method claimed in claim 1, further comprising removing one of the samples from the set of samples by:
identifying, for each angle vector, a hyperplane corresponding to the removed sample and removing them as candidate hyperplanes, determining whether the reduced set of candidate hyperplanes results in selection of a new optimal pair of sibling hyperplanes and, if so, determining an updated classification hyperplane.

9. The method claimed in claim 1, wherein the data space is an N-dimensional data space, and wherein the angle space comprises $[0,\pi) \times [0,2\pi)^{N-2}$.

10. The method claimed in claim 1, wherein the set of samples comprises a set of compact descriptors for video analysis, and wherein the new sample is a descriptor relating to the portion of the image or video.

11. A non-transitory processor-readable medium storing processor-executable instructions which, when executed, cause one or more processors to perform the method claimed in claim 1.

12. A classification device for classifying a portion of an image or video using a classifier, the classification device being based upon a set of samples in a data space, wherein each sample of the set of samples comprises classified image data, wherein the set includes a plurality of samples of one class and a plurality of samples of another class, and wherein the portion of the image or video comprises a new sample in the data space, the classification device comprising:

one or more processors;
memory; and
processor-executable instructions that, when executed by the one or more processors cause the one or more processors to:
map an angle space to a fixed set of angle vectors and, for each angle vector,
find, for each sample, a candidate hyperplane associated with that angle vector, wherein each candidate hyperplane is a radial distance from an origin point measured along a vector from the origin and normal to the candidate hyperplane, and wherein the direction of the vector is givne by the angle vector in the data space;
select a pair of the candidate hyperplanes associated with one angle vector of the first set of angle vectors as an optimal pair of hyperplanes on the basis of a distance between pairs of the candidate hyperplanes parallel to each other and the number of samples between the candidate hyperplanes;
determine a classification hyperplane as a hyperplane parallel to and between the optimal pair of hyperplanes; and
determine whether the portion of the image or video is in the one class or in the another class based on which side of the classification hyperplane the new sample is located.

13. The classification device claimed in claim 12, wherein, each candidate hyperplane passes through at least one of the samples of one of the classes, and wherein the one or more processors select the optimal pair of hyperplanes on the basis that they have the largest distance between them among all pairs of candidate hyperplanes that have no samples between them.

14. The classification device claimed in claim 12, wherein, each candidate hyperplane passes through at least one of the samples of one of the classes, the distance is fixed, and the one or more processors select the optimal pair of hyperplanes on the basis that they have the fewest number of samples between them among all pairs of candidate hyperplanes.

15. The classification device claimed in claim 12, wherein, for each candidate hyperplane, its radial distance is mapped to a fixed set of radial distances.

16. The classification device claimed in claim 15, wherein the one or more processors further identify candidate hyperplanes by building a first matrix for the one class and a second matrix for the another class, and wherein the matrices contains counts corresponding to candidate hyperplanes corresponding to a sample of that respective class at a particular angle vector and radius.

17. The classification device claimed in claim 12, wherein the instructions further cause the output of the classification determination.

18. The classification device claimed in claim 12, wherein the instructions further cause the one or more processors to receive new classified image data which comprises a new training sample, determine additional candidate hyperplanes corresponding to the new training sample, determine whether the additional candidate hyperplanes result in selection of a new optimal pair of hyperplanes and, if so, determine an updated classification hyperplane.

19. The classification device claimed in claim 12, wherein the instructions further cause the one or more processors to remove one of the samples from the set of samples by:
identifying, for each angle vector, a hyperplane corresponding to the removed sample and removing them as candidate hyperplanes, determining whether the reduced set of candidate hyperplanes results in selection of a new optimal pair of sibling hyperplanes and, if so, determining an updated classification hyperplane.

20. The classification device claimed in claim 12, wherein the data space is an N-dimensional data space, and wherein the angle space comprises $[0,\pi) \times [0,2\pi)^{N-2}$.

21. The classification device claimed in claim 12, wherein the set of samples comprises a set of compact descriptors for video analysis, and wherein the new sample is a descriptor relating to the portion of the image or video.

* * * * *